(12) United States Patent
Hibbs et al.

(10) Patent No.: US 10,036,825 B2
(45) Date of Patent: Jul. 31, 2018

(54) SYSTEM AND METHOD TO MEASURE OR GENERATE CURRENTLESS ELECTRICAL FIELD DOWNHOLE

(75) Inventors: Andrew Hibbs, La Jolla, CA (US); Eli Glezer, Del Mar, CA (US)

(73) Assignee: GroundMetrics, Inc., San Diego, CA (US)

( * ) Notice: Subject to any disclaimer, the term of this patent is extended or adjusted under 35 U.S.C. 154(b) by 122 days.

(21) Appl. No.: 14/127,372

(22) PCT Filed: May 22, 2012

(86) PCT No.: PCT/US2012/039010
§ 371 (c)(1),
(2), (4) Date: Feb. 27, 2014

(87) PCT Pub. No.: WO2012/177349
PCT Pub. Date: Dec. 27, 2012

(65) Prior Publication Data
US 2015/0160364 A1    Jun. 11, 2015

Related U.S. Application Data

(60) Provisional application No. 61/499,332, filed on Jun. 21, 2011.

(51) Int. Cl.
*G01V 3/20* (2006.01)
*E21B 47/10* (2012.01)
*G01V 3/26* (2006.01)

(52) U.S. Cl.
CPC ............. *G01V 3/20* (2013.01); *E21B 47/102* (2013.01); *G01V 3/26* (2013.01)

(58) Field of Classification Search
CPC .................................. G01V 3/20; G01V 3/26
(Continued)

(56) References Cited

U.S. PATENT DOCUMENTS 2,203,729 A * 6/1940 Lyons et al. .................. 324/355
2,708,261 A   5/1955 Thompson
(Continued)

FOREIGN PATENT DOCUMENTS

EP   2253971   11/2010
GB   2284062   5/1995
(Continued)

*Primary Examiner* — Jay Patidar
(74) *Attorney, Agent, or Firm* — Diederiks & Whitelaw, PLC

(57) ABSTRACT

The invention relates to measuring and generating electrical fields downhole. In one embodiment a system is provided that includes an amplifier connected to a first electrode in electrical contact with the Earth via an operative capacitive coupling. An additional electrode and amplifier are disposed in the borehole opposite the first electrode and constitute a first pair of electrodes spaced in a direction orthogonal to the axis. A second electrode is part of a group of counter electrodes spaced from each other and disposed outside the borehole. The first pair of electrodes and the amplifiers are configured to be one of a source that generates an electrical field in a direction substantially orthogonal to the axis of the borehole and a sensor that measures an electric field substantially orthogonal to the axis of the borehole.

16 Claims, 10 Drawing Sheets

(58) Field of Classification Search
USPC .................................................. 324/347–375
See application file for complete search history.

(56) References Cited

U.S. PATENT DOCUMENTS

| | | | |
|---|---|---|---|
| 3,319,158 A * | 5/1967 | McDoulett | G01V 3/06 |
| | | | 324/357 |
| 4,745,586 A | 5/1988 | Massa | |
| 6,302,204 B1 | 10/2001 | Reimers et al. | |
| 6,600,321 B2 * | 7/2003 | Evans | E21B 47/0002 |
| | | | 175/50 |
| 6,618,677 B1 | 9/2003 | Brown | |
| 6,686,800 B2 | 2/2004 | Krupka | |
| 6,714,014 B2 | 3/2004 | Evans et al. | |
| 6,724,319 B1 | 4/2004 | Knaack et al. | |
| 6,728,165 B1 | 4/2004 | Roscigno et al. | |
| 6,754,589 B2 | 6/2004 | Bush | |
| 6,920,395 B2 | 7/2005 | Brown | |
| 6,956,371 B2 | 10/2005 | Prammer | |
| 6,961,601 B2 | 11/2005 | Matthews et al. | |
| 7,002,349 B2 | 2/2006 | Barringer | |
| 7,006,676 B1 | 2/2006 | Zeylikovich et al. | |
| 7,034,538 B2 | 4/2006 | Strack et al. | |
| 7,063,174 B2 | 6/2006 | Chemali et al. | |
| 7,066,023 B2 | 6/2006 | Herzen et al. | |
| 7,088,175 B2 | 8/2006 | Krupka | |
| 7,136,757 B2 | 11/2006 | Goloshubin et al. | |
| 7,141,968 B2 | 11/2006 | Hibbs et al. | |
| 7,141,987 B2 | 11/2006 | Hibbs et al. | |
| 7,151,377 B2 * | 12/2006 | Chouzenoux et al. | 324/368 |
| 7,210,342 B1 | 5/2007 | Sterner et al. | |
| 7,240,547 B2 | 7/2007 | Brown | |
| 7,245,560 B2 | 7/2007 | Berg | |
| 7,245,890 B2 | 7/2007 | Kumagawa et al. | |
| 7,265,553 B2 * | 9/2007 | Cheung | G01V 3/38 |
| | | | 324/367 |
| 7,456,632 B2 | 11/2008 | Johnstad et al. | |
| 7,466,148 B2 | 12/2008 | Fridman et al. | |
| 7,483,793 B2 | 1/2009 | Wang et al. | |
| 7,518,443 B2 | 4/2009 | Matthews | |
| 7,519,474 B2 | 4/2009 | Zhou et al. | |
| 7,615,741 B2 | 11/2009 | Jacobi et al. | |
| 7,874,358 B2 | 1/2011 | Breukelman et al. | |
| 7,881,155 B2 | 2/2011 | Close | |
| 7,894,990 B2 | 2/2011 | Wang et al. | |
| 7,941,285 B2 | 5/2011 | Devroes et al. | |
| 7,963,327 B1 | 6/2011 | Saleri et al. | |
| 7,982,679 B2 | 7/2011 | Rhodes et al. | |
| 8,023,690 B2 | 9/2011 | Difoggio et al. | |
| 8,041,510 B2 | 10/2011 | Dasgupta | |
| 8,061,442 B2 | 11/2011 | Alberty | |
| 8,145,427 B1 | 3/2012 | Saleri et al. | |
| 8,145,428 B1 | 3/2012 | Saleri et al. | |
| 8,148,992 B2 | 4/2012 | Kowalczyk et al. | |
| 8,242,928 B2 | 8/2012 | Prammer | |
| 8,264,247 B2 | 9/2012 | Prance et al. | |
| 8,269,501 B2 | 9/2012 | Schmidt et al. | |
| 8,322,228 B2 | 12/2012 | Xie et al. | |
| 8,364,404 B2 | 1/2013 | Legendre et al. | |
| 8,370,122 B2 | 2/2013 | Walker et al. | |
| 8,401,796 B2 | 3/2013 | Morkikami et al. | |
| 8,451,683 B2 | 5/2013 | Chu et al. | |
| 8,463,568 B1 | 6/2013 | Wynn | |
| 8,473,264 B2 | 6/2013 | Barnes et al. | |
| 8,483,445 B2 | 7/2013 | Tjhang et al. | |
| 8,489,375 B2 | 7/2013 | Omeragic et al. | |
| 8,506,907 B2 | 8/2013 | Angelescu | |
| 8,511,373 B2 | 8/2013 | Tosi et al. | |
| 8,527,248 B2 | 9/2013 | Thambynayagam et al. | |
| 8,531,914 B2 | 9/2013 | Delpart-Jannaud et al. | |
| 8,555,729 B2 | 10/2013 | Xie et al. | |
| 8,584,519 B2 * | 11/2013 | Maida | E21B 47/123 |
| | | | 73/152.54 |
| 8,593,140 B2 | 11/2013 | Saldungaray et al. | |
| 8,638,103 B2 | 1/2014 | Rosthal et al. | |
| 8,648,760 B2 | 2/2014 | Parsche | |
| 8,816,689 B2 | 8/2014 | Colombo et al. | |
| 2002/0043977 A1 * | 4/2002 | Vail, III | G01V 3/24 |
| | | | 324/368 |
| 2003/0197510 A1 | 10/2003 | Gianzero et al. | |
| 2007/0257678 A1 * | 11/2007 | Wang | G01V 3/20 |
| | | | 324/366 |
| 2008/0246485 A1 | 10/2008 | Hibbs et al. | |
| 2009/0175125 A1 | 7/2009 | Khan et al. | |
| 2009/0242274 A1 | 10/2009 | Chen et al. | |
| 2010/0019772 A1 * | 1/2010 | Gorek | G01V 3/24 |
| | | | 324/355 |
| 2010/0149056 A1 | 6/2010 | Contant et al. | |
| 2010/0198519 A1 | 8/2010 | Wilt et al. | |
| 2010/0289479 A1 | 11/2010 | Prance et al. | |
| 2011/0066405 A1 | 3/2011 | Chartrand et al. | |
| 2011/0100632 A1 | 5/2011 | Dinariev et al. | |
| 2011/0108283 A1 | 5/2011 | Srnka et al. | |
| 2011/0184711 A1 | 7/2011 | Altman et al. | |
| 2011/0251795 A1 | 10/2011 | Difoggio | |
| 2011/0309990 A1 | 12/2011 | Parsche | |
| 2012/0192640 A1 | 8/2012 | Minh et al. | |
| 2012/0273234 A1 | 11/2012 | Tosi et al. | |
| 2013/0085675 A1 | 4/2013 | Prakash et al. | |
| 2013/0091941 A1 | 4/2013 | Huh et al. | |
| 2013/0110571 A1 | 5/2013 | Saleri et al. | |
| 2013/0140037 A1 | 6/2013 | Sequeira, Jr. et al. | |
| 2013/0193964 A1 | 8/2013 | Wiley, Sr. | |
| 2013/0197877 A1 | 8/2013 | Lu et al. | |
| 2013/0222115 A1 | 8/2013 | Davoodi et al. | |
| 2013/0262069 A1 | 10/2013 | Leonard | |
| 2013/0269423 A1 | 10/2013 | Angelescu | |
| 2013/0282291 A1 | 10/2013 | Dasgupta | |
| 2013/0299164 A1 | 11/2013 | Dale et al. | |
| 2013/0300419 A1 | 11/2013 | Hibbs | |

FOREIGN PATENT DOCUMENTS

| | | |
|---|---|---|
| WO | WO 2003/029615 | 4/2003 |
| WO | WO 2011/044348 | 4/2011 |

\* cited by examiner

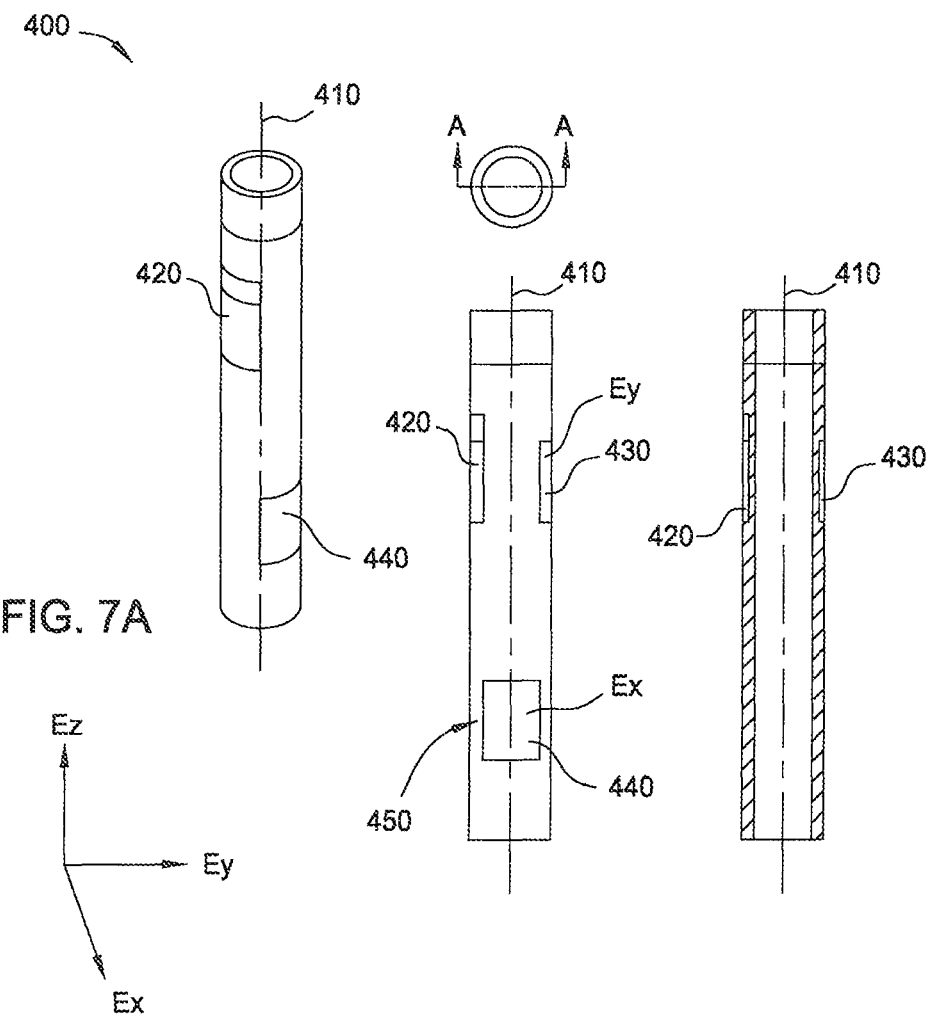

SYSTEM AND METHOD TO MEASURE OR GENERATE CURRENTLESS ELECTRICAL FIELD DOWNHOLE

CROSS-REFERENCE TO RELATED APPLICATIONS

This application represents a National Stage application of PCT/US2012/039010 entitled "System and Method to Measure or Generate an Electrical Field Downhole" filed May 22, 2012, pending, which claims the benefit of U.S. Provisional Patent Application Ser. No. 61/499,332, filed Jun. 21, 2011.

BACKGROUND

Field

The present invention relates to methods and apparatus for probing the subsurface of the earth using electrical fields. More particularly, the invention relates to the generation and measurement of an electrical field oriented in an orthogonal direction to the axis of a cased borehole.

Background

The embodiments described herein relate generally to soundings within the Earth based upon electrical fields. As used herein, "Earth" generally refers to any region in which a borehole may be located including, for example, the lithosphere.

Electromagnetic (EM) geophysical soundings probe electrical conductivity in the ground as a function of depth. Typical targets of interest include ore bodies, hydrocarbons, water, and environmental pollutants. Since the conductivities of such targets and the surrounding medium may be quite dissimilar, they may be discriminated by means of measurement of their subsurface conductivity when subjected to an electromagnetic field. Using this methodology, the depth, thickness, and lateral extent of materials of interest may be determined.

The source of the EM field used in a geophysical sounding may originate in the natural environment, or be manmade. If manmade the source may produce a primarily a magnetic field or electrical field that varies in time and this primary field produces a secondary field in the conducting earth. For example an electrical field produces electrical currents in the earth that have an associated magnetic field, and a time varying magnetic field induces electrical currents that result in an electrical field. The electrical properties of the earth and rate of change of the field determine the relative magnitudes of the secondary and primary fields. The combination of primary and secondary fields results in combined electromagnetic interaction with the earth even for a source arranged to produce solely an electrical or magnetic field.

While the majority of EM geophysical soundings are performed with sensors and EM sources on the surface of the Earth, a borehole can provide physical access to the subsurface. Measurement of the electrical or magnetic field within a borehole can be related to the electrical or magnetic field in the earth around the borehole, or the fields that would exist in the earth in the absence of the borehole. Similarly, connecting an electrical field or magnetic field source to the Earth via a borehole provides a way to produce fields within the Earth at desired depths without the attenuation and uncertainties that may result if the source fields originated from a source at the surface of the Earth.

A common factor in electrical field-based geophysical soundings is the need to couple an electrical circuit to the Earth in order to measure or apply an electrical potential. In the simplest embodiment for measurement, the local electrical potential is coupled into an amplifier by an electrical conductor, or electrode in contact with the earth. For soundings in a borehole, the simplest approach is to remotely insert an electrode in a bore in a location adjacent an area of interest, like a hydrocarbon-bearing formation. However, borehole are typically filled with fluid which gives rise to increased electrode noise due to streaming potentials along with noise related to motion of the sensors within the borehole. As a result, electrical field based methods that require high sensitivity measurements have not been applied in a borehole.

Furthermore most boreholes are lined with metallic tubular known as casing or liner that provides good electrical conductance. For electromagnetic soundings based on magnetic fields, casing produces a small distortion in the magnetic field that is being produced or sensed. However, for EM soundings based on electrical fields, casing has a significant effect and must be taken into account when arranging an electrode that is coupled to the Earth. One approach is to locate the electrode or electrodes on the outside of the casing. However, this approach is unrealistic as the casing it typically cemented in the borehole and any electrode installed at the time the casing is inserted would have to have a service life comparable to that of the casing. Because conventional "galvanic" electrical contact between an electrode and the Earth requires electrochemical exchange of electrode atoms with the surrounding earth and fluids, the electrodes inevitably fail early on. In addition, the presence of the casing in such close proximity to the electrode causes significant distortion of the fields that the electrode is intended to measure.

There exists a need for methods and apparatus for measuring electrical fields in a borehole while avoiding problems associated with galvanic contact and that provides measurement and generation of electrical fields orthogonal from the borehole.

SUMMARY

The invention relates to measuring and generating electrical fields downhole. In one embodiment a system is provided that includes a first electrical conductor within a borehole and in electrical contact with the Earth. An amplifier is connected to the first electrical conductor and a second conductor completes an electrical circuit between the conductors such that the electrical field is oriented in a direction substantially orthogonal to the axis of the borehole.

BRIEF DESCRIPTION OF THE DRAWINGS

FIG. 7 illustrates an apparatus in which four electrodes may be utilized to measure and/or produce three orthogonal components of an electrical field, and FIG. 7A illustrates the various directional components.

DETAILED DESCRIPTION

Figure 1:
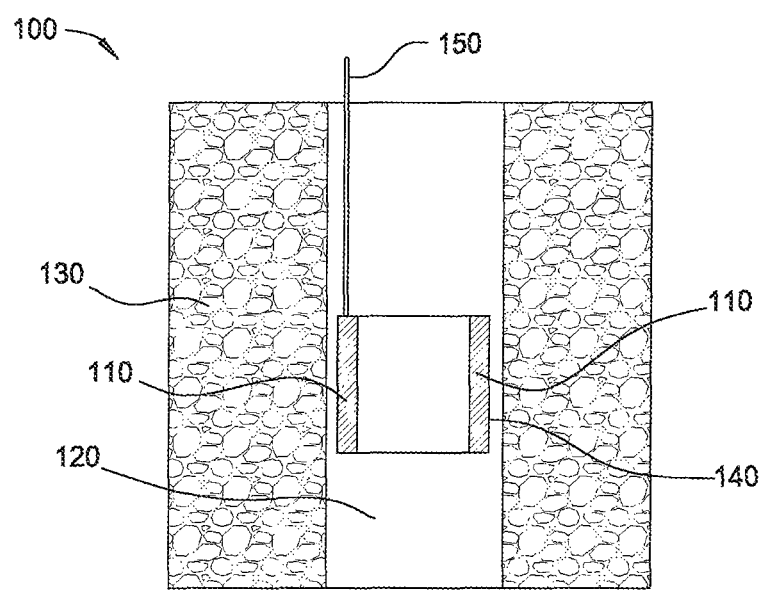
FIG. 1 is a cross section schematic view of an apparatus including an electrode within a borehole, according to aspects of the present disclosure.

As described in more detail below, aspects of the present disclosure provide apparatus and methods for measuring and/or generating electrical fields within a borehole. The apparatus includes an electrode in contact with the Earth that is connected to an amplifier. To overcome problems associated with galvanic electrodes, aspects of the present disclosure implement an electrode that couples to the ambient electrical potential within the borehole fluid in a predominantly capacitive manner.

In the description which follows, like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

The invention relates to borehole geophysics, for which the objective is to probe the Earth at a considerable distance from a borehole. The invention enables the measurement within a borehole of electric fields produced by a remote electromagnetic source, or the generation of fields from a borehole that are measured by remote sensors. In both cases, in practical use, the invention will be used in conjunction with an appropriately chosen commercially available source or commercially available sensors respectively. For example, when the system is used as a measurement device in a borehole, an electromagnetic source of standard design would be deployed on the ground surface or in another borehole in order to produce an orthogonal field at the borehole that is measured by the invention. Similarly, when the system is used as a source within a borehole, a sensor or array of sensors would be deployed at the earth's surface or in one or more other boreholes in order to measure a field produced by the invention. For convenience we term the source or sensors that are used alongside the invention, an associated source or an associated sensor In each case the defining feature is that the associated source or associated sensors outside the borehole, and are separated from the invention by a distance comparable to the depth of investigation within the earth, which in practical cases is at least 100 m. In contrast, in the method of borehole logging, or simply "logging", the source and receivers are lowered or otherwise emplaced in the same borehole, usually integrated together in a self contained housing known as a sonde.

In further contrast, to the orthogonality provided by the invention, all borehole electrical field measurements to date have been limited to measuring the electrical field along the axis of a borehole, and all electrical field sources to date have been configured along the borehole axis. In particular, presently proposed methods to measure electrical fields using ring electrodes in sliding contact with rock or borehole casing walls do not measure electrical fields orthogonal to the borehole axis, and present methods to produce electrical fields from a source in a cased borehole result in a very small fraction of the field being produced a lateral distances of order borehole depth The substantial separation that can be applied between the invention and the associated source or receivers is enabled by the orthogonality of the electric field that is measured or produced with respect to the borehole. The result is that with all other survey parameters the same, much larger subsurface areas can be mapped in a survey that utilizes the invention in its form for either sensing of generation, than can be achieved by a prior borehole sensor or prior borehole source. For example a present borehole to surface electromagnetic (BSEM) survey that can detect formation features in the earth out to a distance of 1.5 km from the borehole can be extended to 6 km by utilizing the invention. In contrast, FIG. 1 is a cross section schematic 100 of an electrode 110 within a borehole 120, according to one aspect of the present disclosure. The borehole 120 is formed in the Earth in material that includes rock, sand, sandstone, soil, salts, volcanic or other material, in particular material that is typically capable of containing hydrocarbons. The borehole section shown in FIG. 1 is an unlined section with no tubular member isolating the interior of the borehole from the material therearound. In the example shown, the electrode is formed with an outer surface intended to compliment an interior surface of the borehole wall to facilitate contact therebetween. Due to the character of material making up the borehole walls, the surface of the material 130 in contact with the electrode 110 may not be entirely smooth and even when the electrode 110, with its complimentary shape is pressed against the material 130, a gap 140 between the electrode 110 and the material 130 may exist. It should be noted that the electrode in the embodiment of FIG. 1 could be a single donut shaped electrode contracted and arranged to facilitate the generation of an electrical field between the electrode and other electrodes remotely located from the wellbore. In other embodiments, the electrode 110 is actually two semi-circular, separate electrodes and the field is generated between them or in the case of sensing, they measure the field adjacent the bore hole.

Fluids, for example, drilling mud, water, brine, and/or oil, may be present in the gap 140. The electrode 110 is in electrical contact with the material via the medium in the gap 140. Accordingly, the electrical fields, in particular the component of the electrical field that is orthogonal to the borehole axis passes from electrode 110 through the medium to the material 130. Depending on the electrical properties of the medium, the electrical impedance between the electrode and material is dominated by the coupling between the electrode and the medium or across the medium itself, or between the medium and the material. In all cases it is total electrical impedance of all three impedances in series that determines the potential difference between electrode 110 and material 130.

The electrode 110 may be electrically connected via a conductor 150 to either one or both of a measurement amplifier and a source of electrical potential, as will be described in more detail with reference to FIGS. 2A-2D and FIGS. 3A-3B. This arrangement of an electrode 110 coupled to the surface of the material 130 at some depth in the Earth is typical of some embodiments described herein. According to aspects of the present disclosure, the electrode 110 may be used to measure (e.g., sense) the electrical potential of the material 130. When the electrode is used in this manner, the electrical potential of the material 130 may be slightly higher than the electrical potential of electrode 110. The assembly shown in FIG. 1 including the electrode, conductor and any amplifier may be inserted into the borehole in any wall known manner including wireline, work string or coiled tubing. In the case of a borehole that is under pressure, the assembly may be inserted on coil tubing via a lubricator in order to maintain the well's pressure.

FIGS. 2A-2D illustrate examples electrical circuits, wherein the electrode 110 may be used for measurement of an electrical potential in the Earth, according to aspects of the present disclosure. The total contact impedance between the electrode and the material is represented by the circuit element 220 placed between the potential 210 of the material 130 and electrode 110. In each of FIGS. 2A-2D, the electrode 110 is connected to a measurement amplifier 230 via conductor 150 in order to amplify and buffer the potential of the electrode 110 so that it may be processed by further analog and digital elements know to those skilled in the art. In one embodiment, both the electrode 110 and the conductor 150 may have negligible electrical resistance compared to contact impedance 220.

Figure 2A:
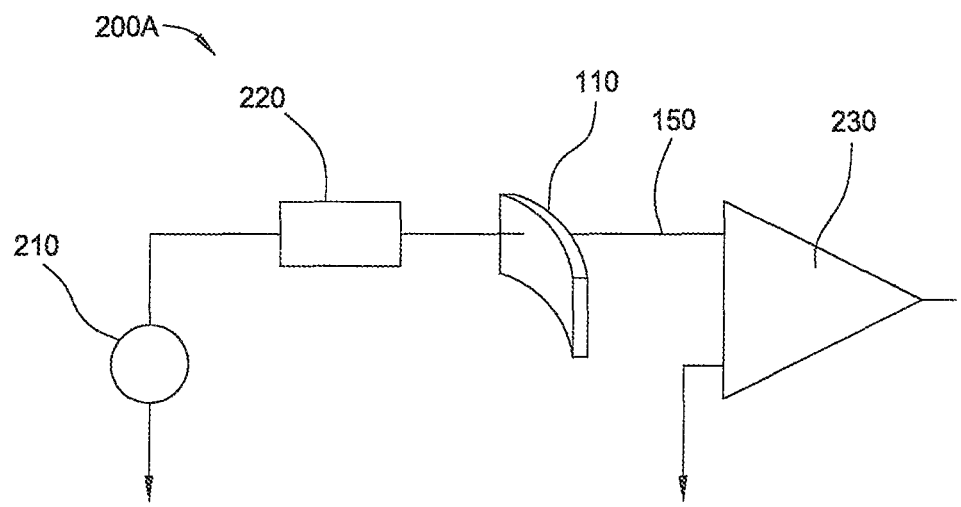
FIGS. 2A-2D illustrate example circuits wherein an electrode may be used for measuring a potential in the Earth, according to aspects of the present disclosure.

FIG. 2A illustrates an electrical circuit 200A wherein coupling impedance 220 connects the electrical potential 210 of the Earth (e.g., material) and the electrode 110, according to aspects of the present disclosure. The impedance 220 is comprised of the electrical contact impedance of the electrode 110 to the fluid in the gap in series with the bulk impedance of the fluid and the contact impedance of the fluid to material 130. In the case that no fluid is present, impedance 220 is the contact impedance of electrode 110 to the surface of material 130.

Figure 2B:
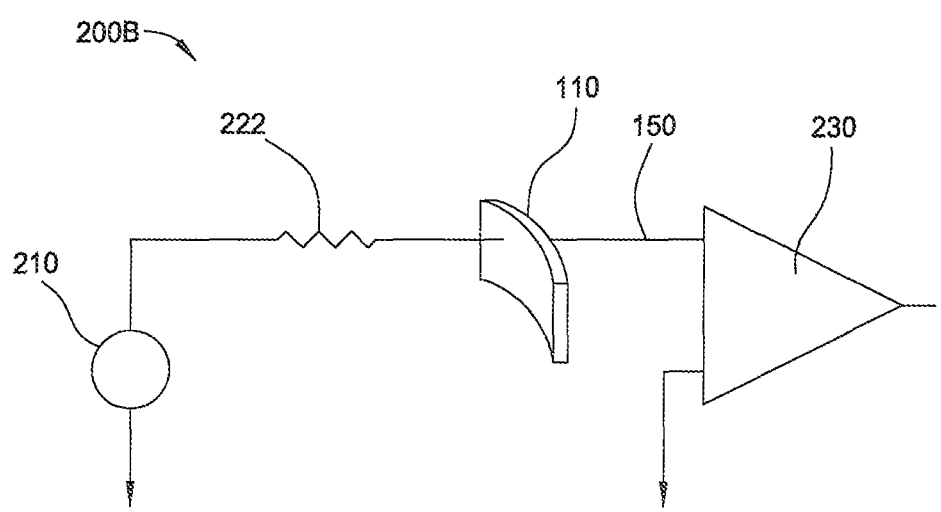

FIG. 2B illustrates an electrical circuit 200B, wherein the coupling impedance of electrode 110 to material 130 is primarily galvanic. Accordingly, the coupling impedance 220 of FIG. 2A may be represented by a resistor 222.

Figure 2C:
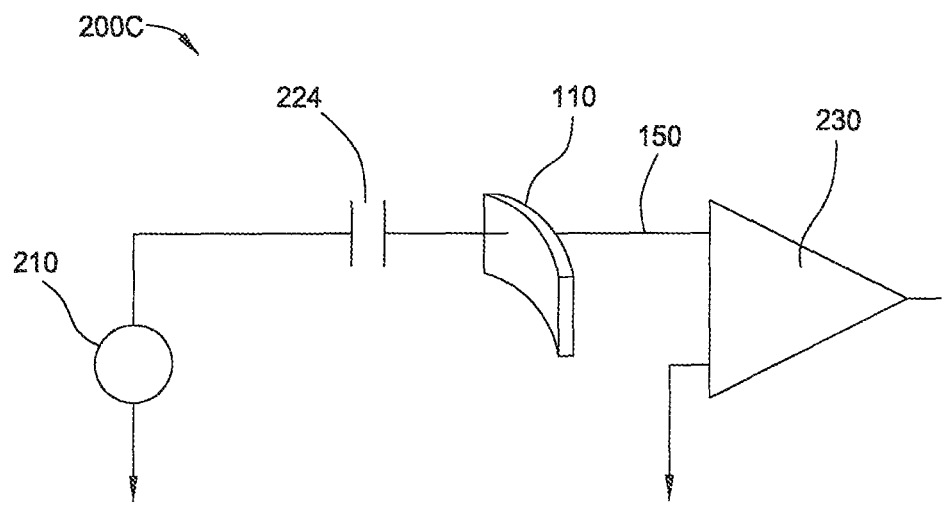

FIG. 2C illustrates an electrical circuit 200C, wherein the coupling impedance of electrode 110 to material 130 is primarily capacitive, according to aspects of the present disclosure. Such capacitive coupling impedance would arise if gap 140 was filled with a gas such as air or methane, or if electrode 110 was treated so that its surface has negligible galvanic coupling to material 130 or gap 140. As shown in FIG. 2C, the coupling impedance 220 of FIG. 2A may be represented by a capacitor 224, when the electrical connection is primarily capacitive.

Figure 2D:
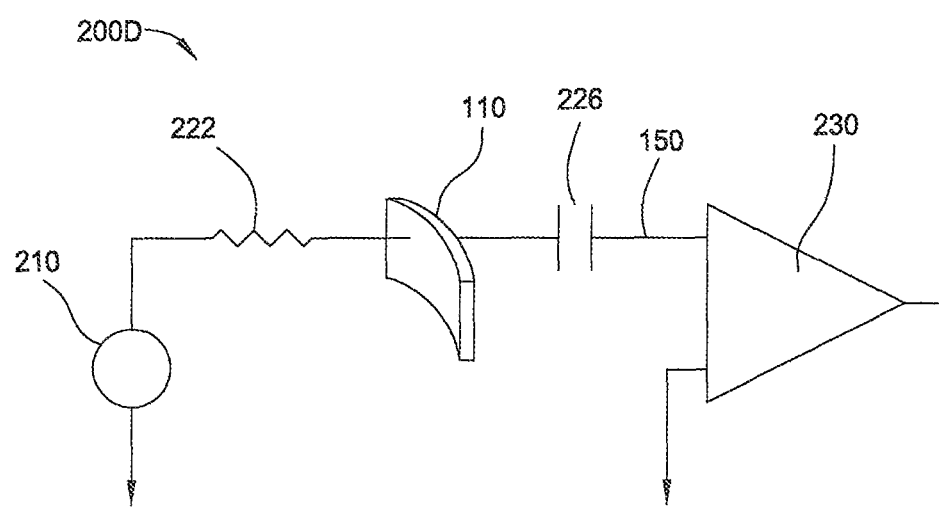

FIG. 2D illustrates an example electrical circuit 200D with a blocking capacitor 226, wherein the electrode's electrical connection is primarily galvanic, according to aspects of the present disclosure. Similar to FIG. 2B, resistor 222 may be used instead of coupling impedance 220, as used in FIG. 2A. However, in FIG. 2D, the blocking capacitor 226 is added in series to prevent DC current flow from the electrode to the medium. Blocking the DC current can reduce electrochemical degradation of the electrode in the corrosive environment of the well and isolate amplifier 230 from DC offset voltages that can arise at electrode 110 due to galvanic coupling.

Referring to back to FIG. 1, according to aspects of the present disclosure, the electrode 110 may be used as part of a source, for example, to generate an electrical field to be applied to material 130. When the electrode is used in this manner, the electrical potential of the electrode 110 may be slightly higher than the electrical potential of the material 130. The difference in electrical potential may depend on the electrical coupling impedance 220 between the electrode and the material, as illustrated, for example, in FIG. 3A.

Figure 3A:
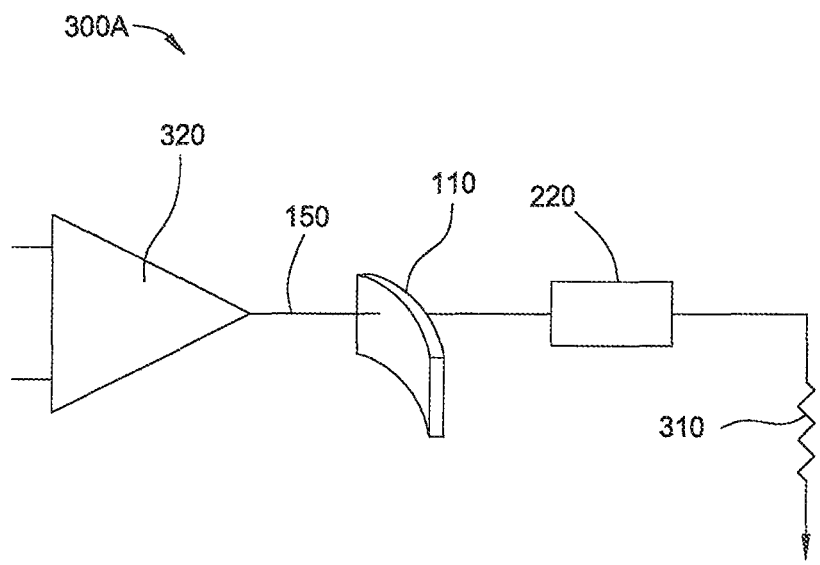
FIGS. 3A-3B illustrate example circuits wherein an electrode may be used to produce an electrical field in the Earth, according to aspects of the present disclosure.
Figure 3B:
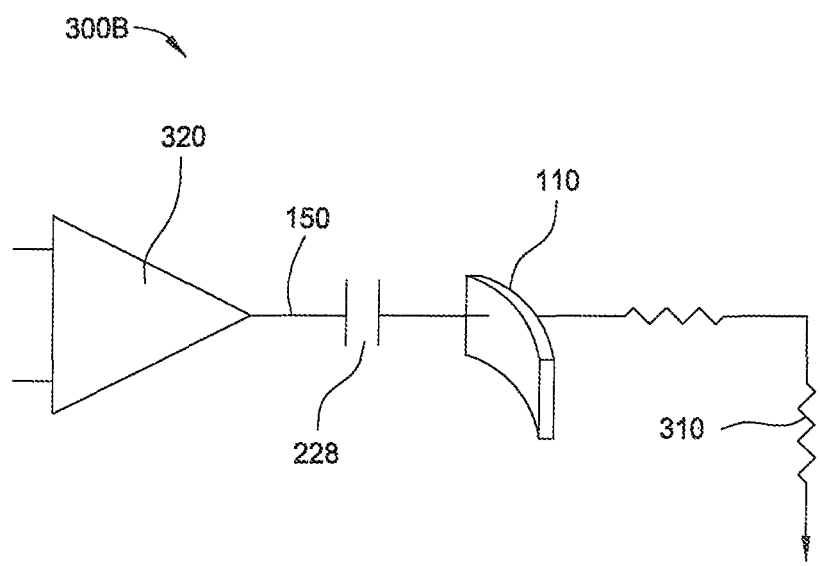

FIGS. 3A-3B illustrate example circuits 300A, 300B that depict an electrode 110 connected to the output of an electrical amplifier 320 for generating an electrical field. The electrode 110 may be connected to the output of the electrical amplifier 320 via conductor 150. In one embodiment the amplifier is located at the surface of the Earth and the conductor 150 extends between the amplifier and the electrode located within a borehole.

In FIG. 3A, the electrode 110 is coupled to material 130 via coupling impedance 220 in a similar manner to the sensing case shown in FIG. 2A. In this case, the electrode is used as part of a source for generating an electrical field, material 130 is represented in the circuit via an electrical resistor 310. When generating an electrical field, the coupling impedance 220 may be predominantly galvanic or capacitive. In addition, a blocking capacitor may be used with a source, for example, in FIG. 3B, a blocking capacitor 228 may used in conjunction with a galvanic electrode 110.

The similarities between the electrical circuit used for measurement of electrical potential in the Earth illustrated in FIGS. 2A-2D and the electrical circuit used for generating an electrical potential in the Earth illustrated in FIGS. 3A-3B may be apparent to those of ordinary skill in the art. According to aspects of the present disclosure, the electrode 110 may be used alternately as both a sensor (e.g., for measuring an electrical field in the Earth) and as a source (e.g., for generating an electrical field within the Earth). In some embodiments, a single apparatus performs one or both the measuring and generating functions. Appropriate means known to those skilled in the art may be employed to isolate measurement amplifier 230 of FIGS. 2A-2D and power amplifier 320 of FIGS. 3A-3B.

Figure 5:
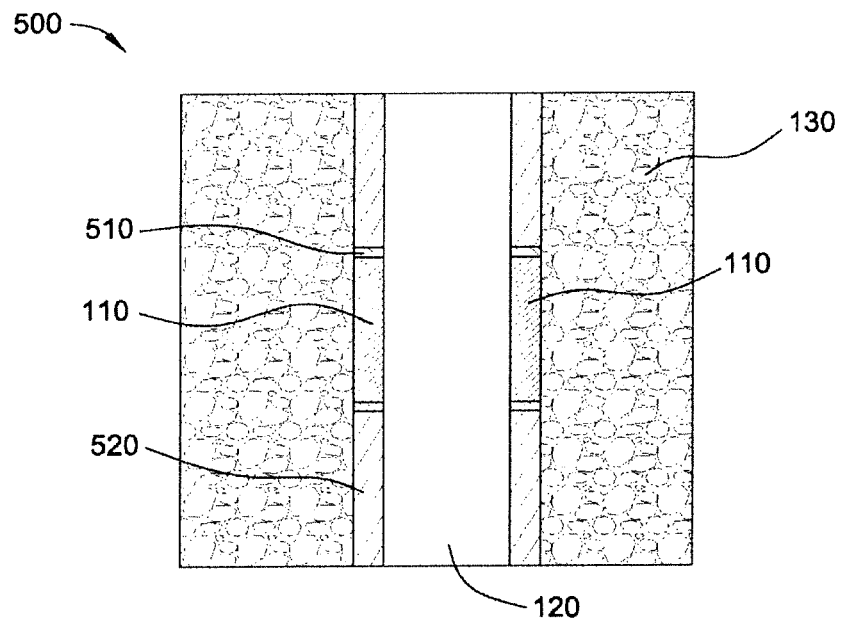
FIG. 5 illustrates an electrode integrally housed in a section of a casing, according to aspects of the present disclosure.

FIG. 5 illustrates an electrode housed in a section of a borehole casing 500. When a borehole 120 is lined with casing 520, an electrode 110 may maintain at least partial contact with the material 130 by making the electrode 110 a portion of the casing 520 wherein an outer surface of the electrode replaces an outer wall of the casing in the borehole. Electrical insulators 510 may electrically isolate the electrode 110 from the remainder of the borehole casing 520. In one embodiment, the insulator is itself a separate section or "sub" that is disposed between adjacent sections of casing with an insulating portion at the end. The section of casing 110 may be accessed electrically by an electrically insulated cable permanently placed in a groove in the outside of section 510, or by a similar cable permanently installed on the inside of the casing, or by an inner electrical conductor that is inserted into the well and electrically connected to the electrode in order to perform a measuring or generating activity.

Figure 4:
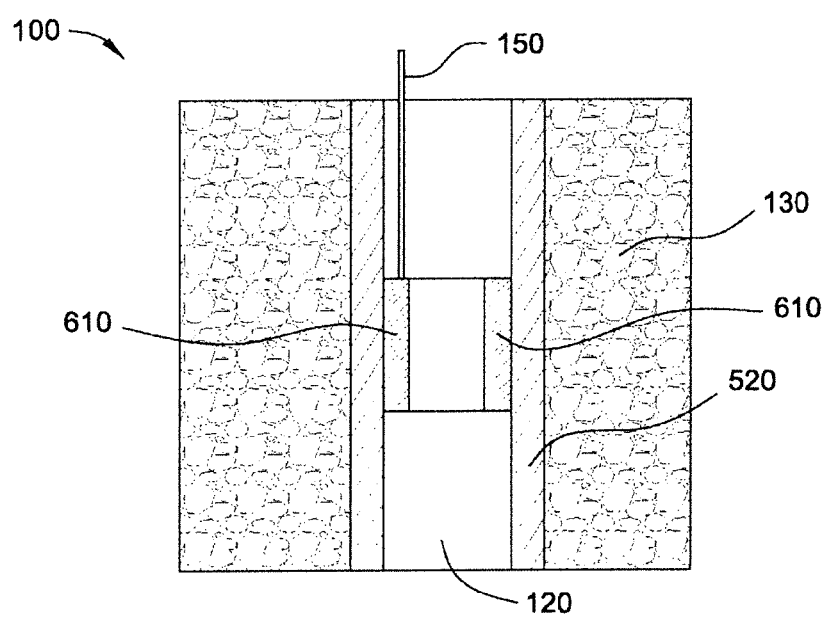
FIG. 4 illustrates an example assembly of FIG. 1 in a cased borehole.

FIG. 4 illustrates an assembly 100 as shown in FIG. 1 run into a cased borehole. In the embodiment of FIG. 4, the, inner electrical conductor 610 may be connected to a source of electrical power and/or an amplifier for detecting an electrical field via connection 150.

The inner electrical conductor 610 may be configured, for example, by mechanical expansion or sliding contact, to make electrical contact with the borehole casing 520 over a defined region. In one embodiment, the assembly is run into a cased borehole and then, through remote actuation, the electrode is extended outwards and into contact with the casing wall. As illustrated in FIG. 4, the inner conductor 610 may serve as the electrode and the borehole casing 520 may become part of the coupling impedance 220, as illustrated in FIG. 2A for measuring an electrical potential or as illustrated in FIG. 3A for generating an electrical potential in the Earth. In this manner, the coupling of the inner electrical conductor 610 to the material 130 may spread over the length of the borehole casing 520.

Similarly, inner electrical conductor 610 may be within a section of pipe within a borehole, and by expansion or otherwise, make contact with the pipe. The pipe may then become a further part of the coupling impedance 220. Regardless of the specific medium in the gap, whether a pipe and/or casing is present in the borehole, or the specific material 130, we define the electrode to be in electrical contact with the Earth when the coupling impedance 220 is less than $10^{12} \Omega$.

Figure 6:
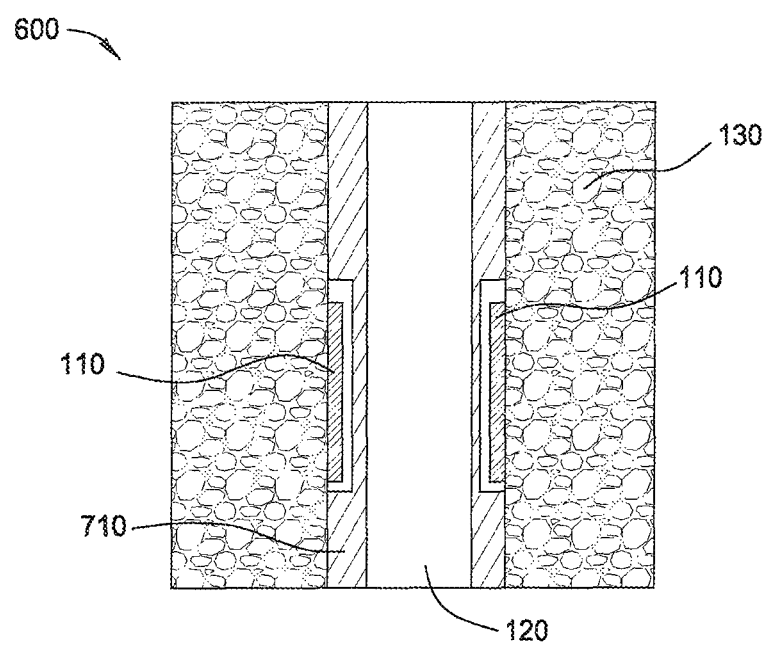
FIG. 6 illustrates an apparatus including an electrode recessed into an outer wall of casing in contact with a section of conducting casing, according to aspects of the present disclosure.

FIG. 6 illustrates an electrode recessed into the outer wall of borehole casing 710. Placing one or more electrodes 110 on the outer surface of a borehole casing 710 permits the electrodes to be flush with the outer surface of the casing to facilitate insertion into the borehole. The electrodes 110 may be in firm mechanical contact with the material 130 including any layer of cement disposed between the borehole and the casing. According to aspects of the present disclosure, the electrodes 110 may be recessed, for example, to reduce mechanical stress during installation of the casing 710 in the borehole 120. If electrode 110 is recessed a gap (not shown in FIG. 6) would exist between their outer surface and material 130. This gap would be filled by a combination of cement, hydrocarbons, water or other fluid that leaks from material 130.

FIG. 7 illustrates an example assembly 400 in which four electrodes, 420, 430, 440, 450 may be utilized to measure three orthogonal components (Ex, Ey, and Ez) of the electrical field, according to aspects of the present disclosure. Ex and Ey represent components of the electrical field orthogonal to the borehole axis 410, and Ez represents the component of the electrical field parallel to the axis of the borehole 410 along the centerline as illustrated by directional lines in FIG. 7A. Assembly 400 may be inserted into an uncased borehole such as in the configuration shown in FIG. 1 or be implemented by separate insulated sections of a borehole casing as in FIG. 5 or be arranged on the outside of a casing as in FIG. 6. For measuring, each of two electrodes 420, 430 may be positioned in opposition on either side of the borehole axis 410 in order to measure the electrical field orthogonal to the borehole axis 410. For example, electrodes 420 and 430 may be used to measure the orthogonal component Ey. When used as a source to generate an electrical field, separate electrodes may be driven independently to produce a desired electrical field pattern within the Earth, or electrodes 420 and 430 for example may be connected together as a single electrode, or as opposing electrodes, for example 420 and 430, may be implemented as a single electrode, for example as a continuous cylinder around axis 410.

In the illustrated equations below, V1 and V2 represent electrical potentials of the electrodes configured to measure Ex, the electrode 440 and an equivalent electrode 450 on the reverse side of assembly 400 (not visible in FIG. 7), and V3 and V4 represent the electrical potentials of the electrodes 420 and 430 configured to measure Ey. For the configuration illustrated in FIG. 7:

$$E_X = k_X(V_1 - V_2),$$

$$E_Y = k_Y(V_3 - V_4), \text{ and}$$

$$E_Z = k_Z(V_1 + V_2 - V_3 - V_4),$$

where kx, ky, and kz represent constants with units of 1/length. The kx, ky, and kz constants may be related to the distance between the respective electrode sensing plates. The constants may be estimated by models or measured directly by placing the assembly in a known electrical field. For example, for an assembly 400 with internal diameter 15 cm and axial distance between electrodes 420 and 440 of 2 m, $kx \approx ky \approx 6$ $m^{-1}$ and $kz \approx 0.5$ $m^{-1}$.

FIG. 7 and the expressions for Ex, Ey and Ez illustrate the fundamental difference between the invention and borehole logging methods that measure electrical current flow from a borehole casing into the surrounding medium. One objective of the invention is to measure an electric field that is present within the borehole. Measurement of these fields does not require good low impedance contact to a casing that is metal. Indeed, the invention in intended to function if surrounded entirely by air or fluid within the borehole without any mechanical contact to the casing, or if the casing is a non conductor, or if the borehole is open.

In some instances it may not be necessary that all three components of the electrical field be measured, or that four electrodes are used. For example, an embodiment of the assembly 400 may have four electrodes as shown but only be configured electrically to produce the outputs Ex and Ey. In another embodiment, a third pair of electrodes may be mounted on the surface of assembly 400 in a similar manner to electrodes 420, 430 but axially displaced from 420, 430 in order to provide a measurement of field Ey at a different axial location from the first measurement of Ey. In general, the electrodes may be located at any radial and relative axial position. Similarly, electrodes 420 and 440 do not have to be the same size or shape or be arranged symmetrically. For example, an electrode at one axial location, e.g. 440 and 450 could be combined as single cylinder, while electrodes 420 and 430 are individual flat plates. Such a configuration could be used to measure fields Ey and Ez.

Due to the confined space within the borehole 120, the electrodes 110 may be relatively thin in at least one dimension. Implementing the electrode on the outer surface of the borehole casing 710 (FIG. 6) may separate the electrode 110 from the internal region of the borehole 120. This separation may isolate the electrodes from electrical noise within the borehole 120, and from possible variations in the resistance connecting the electrode to other regions within the borehole due to fluid flow, for example changes in oil to brine ratio. The configuration illustrated in FIG. 6 may also have very limited fluid and movement of fluid in the immediate vicinity of the electrodes 110.

Locating an electrode 110 on the outside of the borehole casing 710 may complicate access to amplifiers 230 of FIGS. 2A-2D and 320 of FIGS. 3A-3B. According to aspects of the present disclosure, a cable, for example cable 150 of FIG. 1, may make electrical contact to electrode 110 via an insulated connection that passes through the wall of the casing 710

Figure 8:
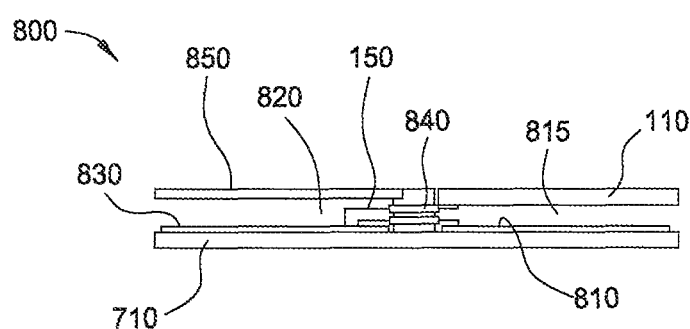
FIG. 8 illustrates a cross section of a casing with discrete annular spaces for the electrode and an amplifier, according to aspects of the present disclosure.

FIG. 8 illustrates a cross section schematic 800 of a borehole casing 710 with an annular space 815 for an electrode 110 and a separate annular space 820 for an amplifier 830, connected by a conductor 150 that is routed by an insulated connector 840 according to aspects of the present disclosure. The arrangement of FIG. 8 permits electrode 110 to be exposed to high pressure in the borehole while plate 850 forms a sealed compartment in annular space 820, thereby protecting the amplifier and other sensor electronics 830.

The physical arrangement of an electrode within a borehole may be driven by two factors. First, for a given amplifier voltage, noise level, and negligible environmental noise, the sensitivity of an electrical field measurement may be improved the further apart the electrodes such as 420 and 430 are located. Second, a conductor placed in borehole fluid may act as a low impedance path in the fluid, drawing the electrical field into it and minimizing the electrical field across it.

The first factor leads to a configuration in which electrodes may be positioned close to the borehole walls in order to maximize electrode separation. However, this may leave a relatively large volume of borehole fluid between the electrodes. Because the conductivity of borehole fluid may be highly variable between different boreholes, it may be preferable to electrically isolate the fluid between electrodes from the regions where the electrodes measure electrical potentials associated with an electrical field. Additionally, there may be a risk that electrical potentials produced elsewhere in the borehole may appear as electrical interference. Similarly, the motion of magnetic particles and variations in fluid composition and density may generate electrical field noise within the borehole fluid. Thus, in an effort to maximize the sensitivity of an electrical field measurement within a borehole it may additionally be advantageous to shield, or otherwise avoid noise emitted from the region of borehole fluid between the electrodes from being recorded by the electrodes.

Figure 9:
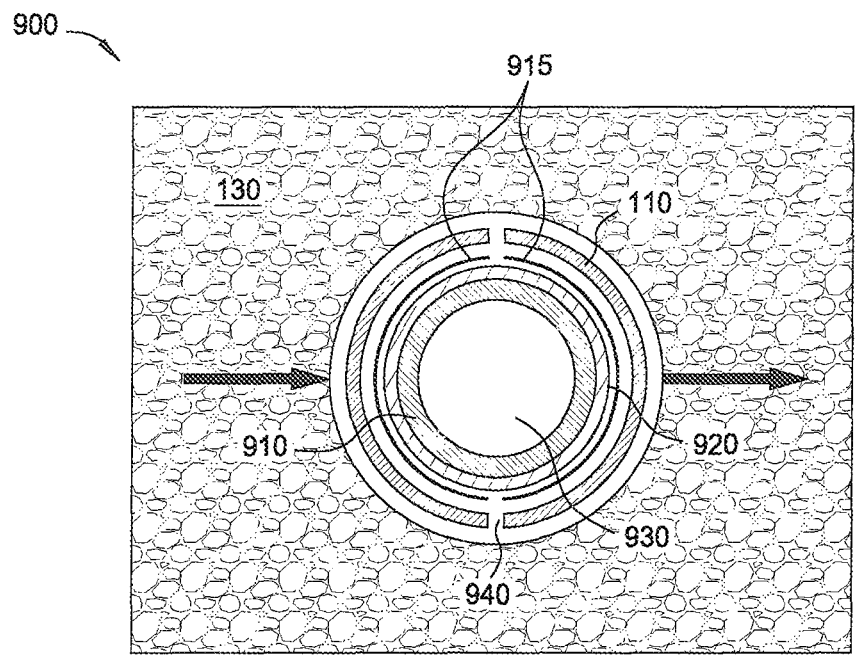
FIG. 9 illustrates a cross section view of a borehole sensing configuration to electrically isolate components from borehole fluid, according to aspects of the present disclosure.

FIG. 9 illustrates a cross section of a borehole 900 with a shield according to aspects of the present disclosure. A shield 910, 920 may be inserted between electrode 110 and the borehole fluid in an effort to electrically isolate borehole bulk fluid 930 from borehole fluid 940 in the vicinity of electrode 110. In the embodiment shown, the shield is comprised of a conducting component 910 and a boundary 920 that may be at least partially insulating.

The thickness of the insulating boundary 920 of the shield may be sufficient to limit capacitive coupling across the shield to a negligible level. This may have the effect of guiding the electrical field around and away from the fluid in the bulk region, thereby reducing the effect of conductivity and permittivity variations in the borehole bulk fluid 930 on the electrical potentials at the electrodes 110. The conducting component of the shield 910 may prevent noise produced in the bulk fluid 930 from passing into the sensing region 940.

The conducting shield 910 may improve the accuracy of measuring the electrical field in a direction orthogonal to the borehole axis (e.g., Ex). The electrical field orthogonal to the borehole axis may be challenging to achieve a high measurement signal to noise ratio (SNR), for example, due to the reduced plate spacing that may be achieved within a borehole. According to aspects of the present disclosure, the shield 910 may extend beyond the ends of the electrodes that measure the orthogonal axes, e.g. 420, 430. Electrical field noise along the axis of the borehole may be reduced in a similar manner as illustrated in FIG. 9 for the orthogonal axes. An at least partially insulating plate, with an at least partially conducting layer interior to the at least partially insulating plate may be used in the vicinity of each Ez sensing plate to function in an analogous manner to the electrodes used for orthogonal axis fields. The parallel axis shields at each electrode plate may be connected together to shield the bulk fluid in the region between the plates. When parallel axis shields are used they may be perforated at their ends to allow the borehole fluid to flow through them.

To maximize SNR in confined geometries within a borehole, a guarding surface 810 may be added as illustrated in FIG. 8, (and 915 in FIG. 9). The surface is driven by feedback at the same potential as the electrodes that sense the target potentials in order to reduce capacitive coupling within the system and to provide electromagnetic shield. Guards may be integrated in very close proximity to the potential sensing elements. The guards for a given electrical field measurement axis may have similar size and position as the shields for that axis. Partially insulating shields, at least partially conducting shields, and guarding elements may be referred to as noise reduction devices regardless of their specific geometry and method of operation. For reasons of clarity it should be noted that a noise reduction device as taught herein may be a device that modifies the electrical field in the vicinity of an electrode where the electrical field is measured for the purpose of improving the SNR of the measurement. A noise reduction device is specifically not a device that measures some other physical parameter in the environment (e.g., fluid conductivity or flow rate) for the purposes of improving the electrical field measurement.

The configurations illustrated in FIGS. 1 and 4-9 may be particularly beneficial for a borehole environment because they may provide an open central region for the passage of fluid or equipment such as a logging tool. Similarly, one or more electrodes may be mounted in the vicinity of a drilling tool to provide a capability to measure the local environment. When combined with an appropriate source, such a measurement may provide a capability to guide the direction of travel during direction drilling, for example, to improve traversing a borehole within a target geological formation.

In some situations, for example, when the borehole fluid is stationary, it may not be necessary to shield the electrodes from the bulk fluid. The conducting shield 910 and/or insulating boundary 920 may be removed. In addition, although it may be preferable for sensitivity reasons to immerse the electrodes directly in the borehole fluid, the electrodes may be mechanically separated from the fluid by placing them in a similar compartments to the one 820 used for the electronics. Such a compartment would be evacuated and/or filled with gas thereby producing electrical isolation of the electrode similar to that obtained for sensing electrical fields in air. Measurement circuits particularly suited to measurement of electrical fields in air are taught in U.S. Pat. No. 6,686,800 and that patent is incorporated by reference herein in its entirety.

The electrodes may operate via primarily galvanic coupling, a mixture of galvanic and capacitive coupling or, via predominantly capacitive coupling. Capacitive coupling is beneficial because it allows the electrode to be protected against the chemical environment of the borehole, thereby increasing its operating lifetime. Specifically, the electrode is arranged to be electrochemically segregated with respect to the earth, yielding what is termed herein as an "operative capacitive coupling" between the electrode and its environment. For convenience, the aspect of the electrode that effects the electrochemical segregation is termed a "barrier" herein. There are several possible approaches to accomplish the electrochemical segregation of the sensing plate 210. First, the electrode may, for example, comprise a conductor, (e.g. a metal, such as copper), coated with a passivation layer that does not chemically react with the earth. Examples of such a coating may include plastic, Teflon® or other chemically non-reactive coating. The barrier in this case would comprise the passivation layer. Alternatively, the electrode may be made from a material, including but not limited to aluminum (Al), tantalum (Ta) and titanium (Ti), that can be treated so as to form a protective layer at its outer surface. For example, an oxide layer could be formed on the outer surface of the material. In such a case, the barrier would comprise the protective layer. In both of these cases, it is preferable that the passivation layer or the protective layer be impervious to fluids that are potentially present in the earth. As another way to affect the barrier to electrochemically segregate the electrode from its environment, the electrode may be made entirely from a material that is adequately chemically inert in the intended environmental conditions, including but not limited to, graphite, carbon fiber, titanium, or stainless steel. In this case, the character of the chemically inert material provides the barrier. In some cases, it may be desirable to include multiple barriers, that is, incorporating multiple methods of reducing electrochemical reactions of the electrode with its environment. In all cases it is understood that one or more barriers are deliberately added to the system as part of its design and manufacture. Considering the desired duration of monitoring and chemical conditions in a borehole, capacitive coupling may be implemented at a level that is necessary and cost effective for a given application.

The electrical coupling impedance 220 between the electrode and the earth may be represented by a parallel combination of a coupling capacitance Ce and coupling resistance Re. The bulk resistance of the electrode is generally negligible in comparison to the other impedances and can be considered to be included in the value of Re. We define "operative capacitive coupling" between the electrode 110 of the present invention and the material 130 comprising the earth, through the medium 140, when created by a barrier which provides electrochemical segregation of the electrode with respect to its environment, that results in a value of Re>10 kΩ and Ce>2000 pF over the entire operating frequency range of the sensor.

Figure 10:
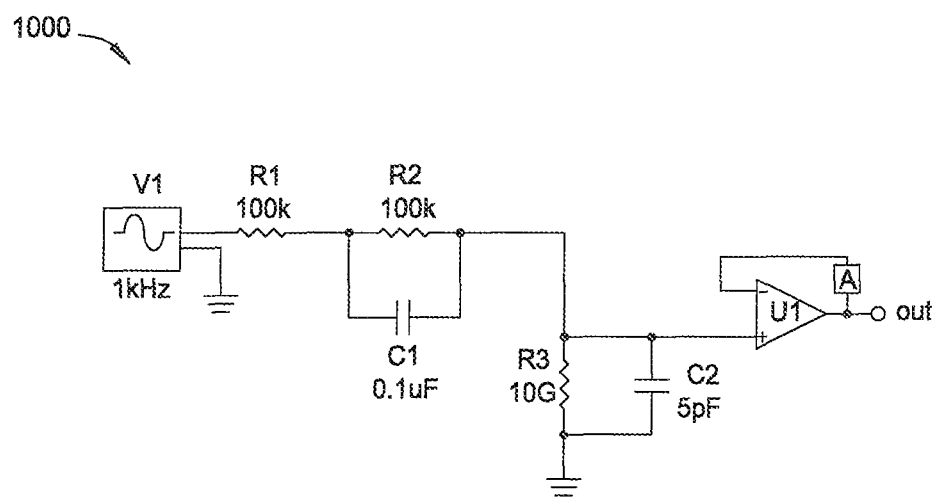
FIG. 10 illustrates a general measurement circuit architecture for electrical measurements, according to aspects of the present disclosure

FIG. 10 illustrates a circuit architecture 1000 for electrical potential measurements, according to aspects of the present disclosure. The potential of the environment is represented by the voltage source, V1 and the impedance of the fluid in the gap by resistance R1. The electrode couples to the fluid by the capacitance shown as C1 and R2 in parallel. This capacitance depends on the size of the electrode and the nature of the environment. For example, in seawater C1 may be as high as 100 mF. For a measurement in a borehole, C1 and R2 depend upon borehole fluid composition, particularly salt content. A lower limit for C1, in the case of very low conductivity fluid may be of the order of 1 μF, corresponding to an impedance of 160 kΩ at 0.1 Hz, and 1.6 kΩ at 10 Hz. The parallel resistance R2 depends on the quality of the electrochemical passivation that is applied to the electrode and the nature of the fluid with which it is in contact. The signal that is coupled to the input of amplifier U1 depends on the relative values of the combined impedance formed by the combination of R1, R2 and C1 and the amplifier input impedance (formed by R3 and C2). In all practical cases this amplifier input impedance is by far the largest impedance and the voltage V1 appears at the amplifier input without significant attenuation. Accordingly, the key factor in the performance of the electrical potential measurement circuit is its internal noise level. This noise is set by the amplifier itself and the thermal noise produced by resistors R1 and R2. Spectral noise at 1 Hz and 100 Hz for an electrical field sensor built according to an aspect of the invention and operating in a sample of almost pure crude oil (very little brine component) at room temperature is provided in Table 1. The projected values for the same oil sample at 125° C. and for brine, are also listed in Table 1. When combined with other aspects of the invention, the sensitivities reported in Table 1 are adequate to detect electrical fields produced by an electrical field source located a considerable distance away from the borehole, for example from a source greater than 100 m away

TABLE 1

Internal Noise for an Electrical Field Sensor built according to an aspect of the invention when Measuring a Crude Oil Sample. Actual Data is for crude oil at 20 C.

| Sample | Measured or projected conductivity (mS/m) | Sensor noise at 1 Hz (nV/m√Hz) | Sensor noise at 100 Hz (nV/m√Hz) |
|---|---|---|---|
| Crude oil (20 C.) | 0.050 | 180 | 160 |
| Crude oil (125 C.) | 2.5 | 37 | 37 |
| Brine | 100 | 10 | 10 |

The electrical circuits of FIGS. 2A-2D, 3A-B, and 10 illustrate a single electrode connected to a circuit that is referenced to a ground point. In a practical borehole system, this ground point may be implemented within system electronics and a second physical connection to the Earth may be needed to complete the electrical current path of the electrode. For convenience, the second electrode may be referred to as a counter electrode. Within a borehole the second electrical connection may be subject to the same physical requirements and environment as the first electrode. Accordingly, in borehole systems the counter electrode may be implemented in an identical manner as the first electrode (e.g., electrodes 420 and 430 of FIG. 7). According to aspects, the first electrode and the counter electrode that completes the input electrical circuit may be identical and interchangeable.

According to aspects of the present disclosure, both the electrode and counter electrode may be located in the borehole. In another aspect, the electrode may be located in a borehole and the counter electrode may be located in another borehole or at the ground surface. The latter configuration may be particularly effective when electrode is used as part of a source of an electrical field. Providing such a source may generate substantial electromagnetic fields at substantial distances (>2 km) from a borehole at the depth of a geologic formation of interest.

Figure 11:
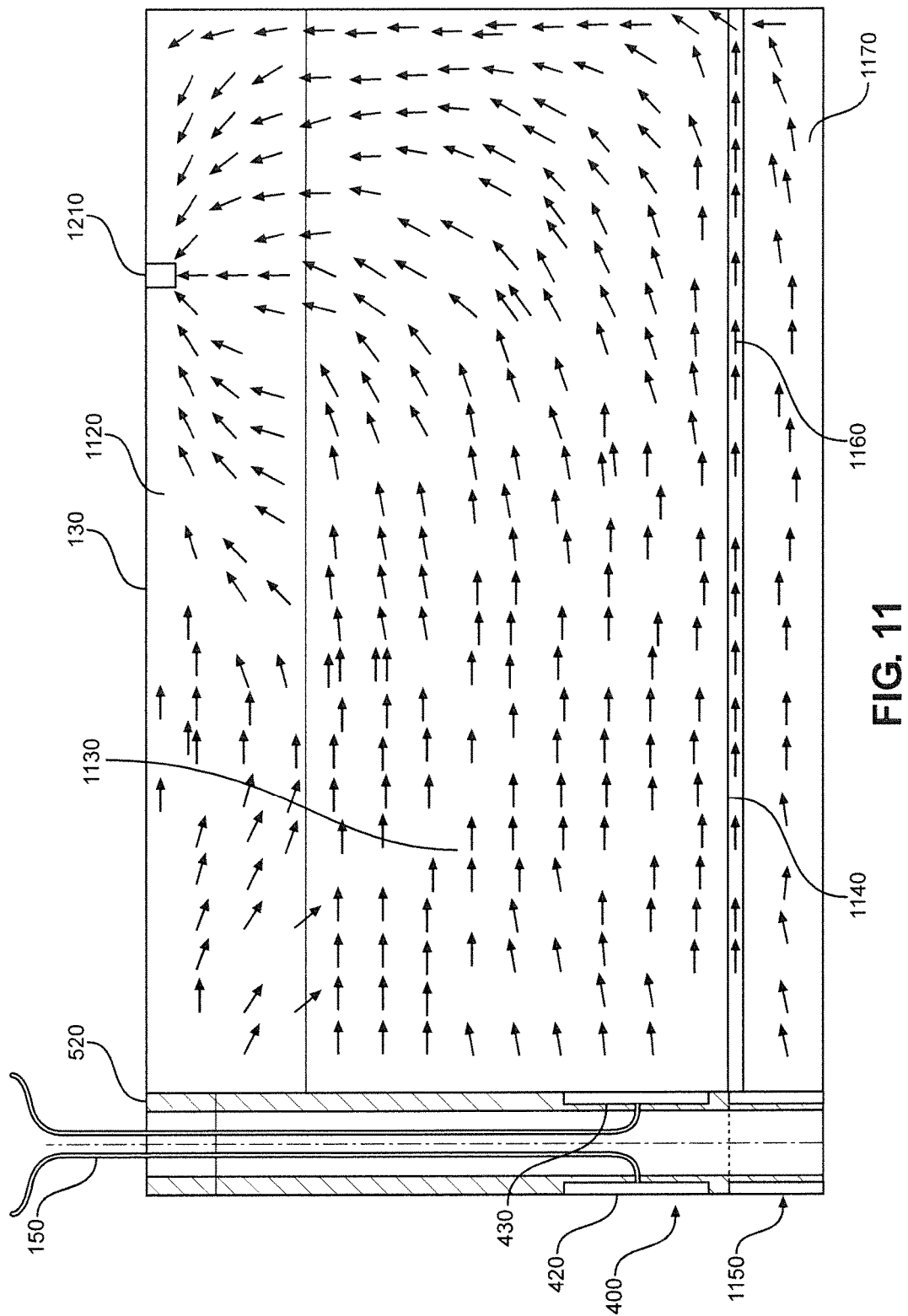
FIG. 11 is a numerical calculation of the electrical field distribution at a borehole for counter electrodes located at a radial distance 0.1, 1, and 3 times the depth of the electrode in the borehole.

FIG. 11 illustrates a counter electrode 1210 located at or near the ground and electrical fields generated between the counter electrode 1210 and the borehole. FIG. 11 also illustrates pair of electrodes, first electrode 420 and another electrode 430 (shown in more detail in FIG. 7), which are connected to a circuit such as that shown in FIGS. 2A-2D when used for measuring a potential or are connected to a circuit such as that shown in FIGS. 3A-3B when used to produce an electrical field in the Earth. To produce electromagnetic fields using an electrode and a counter electrode 1210 requires a substantial orthogonal component of electrical field at the borehole. In an effort to produce such an orthogonal field, the counter electrode 1210 may be located at a radial distance from the well comparable to the depth of the electrode located within the well. For example, for an electrode at depth 1 km the counter electrode may be located at a distance of 200 m, or 1 km or 5 km. For example, FIG. 11 is a computer generated illustration of the electrical field generated within the earth for an electrode 1150, or pair of electrodes 420, 430, at depth 2000 m in a borehole with conductive casing 520 with a counter electrode 1210 on the surface of the Earth at a radial distance of 3000 m. The electrical field at a point within the earth is represented by lines 1160. In this model the earth is comprised of an upper layer 1120 of conductivity 200 Ωm, a second layer 1130 of conductivity 10 Ωm, a hydrocarbon layer 1140 of conductivity 10 Ωm and a lower level 1170 of conductivity 200 Ωm.

Figure 12:
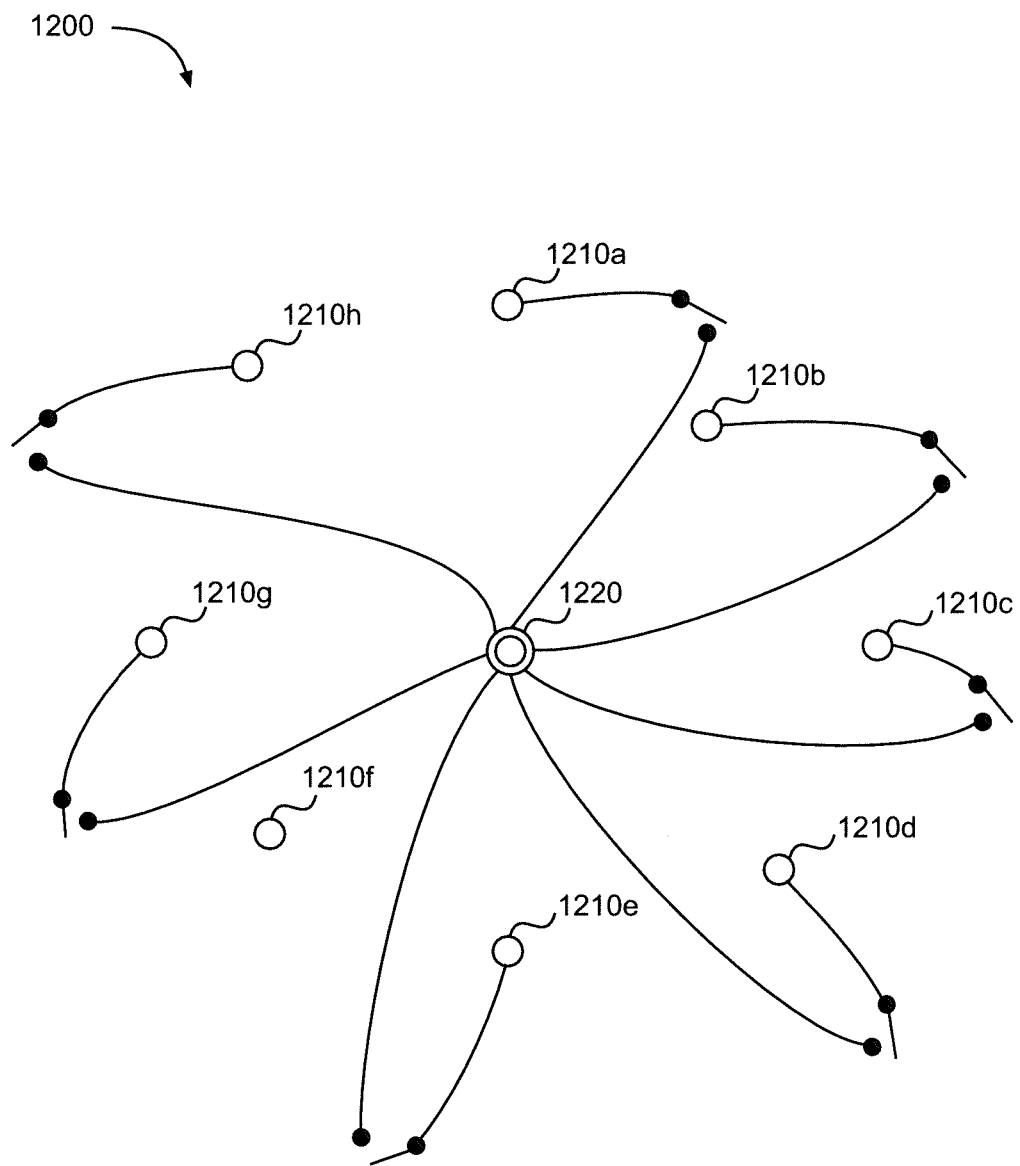
FIG. 12 illustrates a configuration of counter electrodes arranged around a borehole, according to aspects of the present disclosure.

It is clear from FIG. 11 that the electrical field within the earth is oriented substantially orthogonal to the axis of the borehole, not only very close to the borehole, for example within 5 m, but at a radial distance from the borehole comparable to the radial distance of the counter electrode This large projection of the field via its orientation orthogonal to the borehole enables the subsurface to be probed over a large area, for example by measurement made by one or more sensors on the ground surface. The location of the counter electrode determines the region that is probed by the field. In contrast, for methods that utilize a surface electrode as part of a measurement of current flow from a casing into the earth in the immediate vicinity of the casing, the location of the counter electrode is unimportant provided it is sufficiently far away that a majority of the current injected into the casing enters the formation While FIG. 11 illustrates fields associated with a single counter electrode, to achieve a wide area of coverage two or more counter electrodes are typically deployed. These electrodes are all connected to the same amplifier so they act as if they were a single electrode split into a number of parts at different locations. FIG. 12 illustrates a configuration 1200 of multiple split counter electrodes shown in plain view at the surface of the earth, according to aspects of the present disclosure. Splitting the counter electrodes into two or more individual electrodes 1210 promotes the propagation of an electrical field in the earth around the borehole in multiple directions. In one embodiment, the individual electrode elements 1210 may be spaced at approximately equal radial distance around the borehole 1220. If desired, the radial distance of each individual electrode may be selected based on a model of the ground conductivity in the vicinity of the borehole in order to produce a desired distribution of electrical field within the ground. Furthermore, individual counter electrodes, for example 1210a, 1210b, and 1210c can be selectively used, for example by closing a switch, while other counter electrodes are unused, for example by opening a switch in order to focus the field within the ground in a desired azimuthal direction. If desired, individual counter electrodes 1210, or groups of counter electrodes 1210a 1210b can be activated serially in time to produce an electrical field in the ground that rotates or otherwise changes its azimuthal distribution around borehole 1220. According to aspects of the present disclosure, two or more of the split counter electrodes 1210 may be located at depth within a borehole. Regardless of the location of the split counter electrodes 1210, one or more individual counter electrodes may be electrically connected together by cables so that they function as a single, distributed counter electrode.

Aspects described herein may be implemented in an existing borehole according to various configurations previously described. In some instances, such as for enhanced oil recovery, boreholes at the desired locations may be involved in production, and therefore, may not be available for installation of electrodes. Accordingly, a custom borehole may be drilled for installation of the electrodes at a desired depth. Such a borehole may not have to be used for transporting fluid or gases and may be entirely filled by the assembly described herein. Furthermore, a custom borehole drilled solely for a measuring/generating operation may be of minimal diameter r (e.g., a slim line hole) and may reduce drilling costs.

As described herein, aspects of the present disclosure improve utilization of electrical fields in or around a borehole for geophysical purposes. It is well known by those skilled in the art that ancillary measurement taken at appropriate locations may be used to improve the utility of an electrical field measurement. For example, a measurement of the local magnetic field may be combined with electrical field data to infer ground conductivity. Separate electromagnetic measurements may be used to identify a source of interference. Accordingly, the borehole electrical field sensor described herein may be combined with other sensors, either inside or outside of the borehole, to improve the value of the data it produces. One or more of the additional sensors can be integrated or otherwise attached to the electrical field sensor.

Although described with reference to preferred embodiments of the invention, it should be readily understood that various changes and/or modifications can be made to the invention without departing from the spirit thereof. In general, the invention is only intended to be limited by the scope of the following claims.

We claim:

1. A system for measurement of an electrical field downhole comprising:
 a first electrode within a borehole having an axis, the electrode being in electrical contact with the Earth via an operative capacitive coupling;
 an additional electrode disposed in the borehole opposite the first electrode, wherein the first electrode and the additional electrode constitute a first pair of electrodes spaced in a direction orthogonal to the axis of the borehole;
 a first amplifier connected to the first electrode and an additional amplifier connected to the additional electrode;
 a second electrode configured to produce an electrical field, with the second electrode being part of a group of counter electrodes spaced from each other and remotely located from the borehole, and wherein the first pair of electrodes and the first amplifier and the additional amplifier are configured to be a sensor that measures a first component of the electric field substantially orthogonal to the axis of the borehole; and
 a second pair of electrodes in the borehole, the second pair constructed and arranged to measure a second component of the electrical field in a direction substantially orthogonal to the borehole.

2. The system of claim 1, wherein the borehole is lined with a casing and the first pair of electrodes is disposed in a section of the casing, the section electrically isolated from the casing thereabove and below.

3. The system of claim 1, wherein the borehole is lined with a metal casing and the first pair of electrodes is disposed on an exterior wall thereof.

4. The system of claim 3, wherein the first pair of the electrodes is recessed in the exterior wall and constructed and arranged to be electrically isolated from the casing.

5. The system of claim 1, whereby the first electrode, the additional electrode and the second pair of electrodes are constructed and arranged to measure a third component of the electrical field.

6. The system of claim 1, wherein the system is substantially open to allow the passage of fluid through the borehole.

7. The system of claim 1, further including a noise reduction device.

8. The system of claim 1, wherein the counter electrodes are located more than 100 m from the borehole.

9. The system of claim 1, wherein the counter electrodes are located on the surface of the Earth.

10. The system of claim 1, wherein the counter electrodes are located at a radial distance from the borehole of greater than 0.5 times the depth of the first electrode in the borehole.

11. The system of claim 1, wherein the counter electrodes are located at a radial distance from the borehole of greater than 1 km.

12. A method of measuring an electrical field at a location within a borehole having an associated axis with a system including a first electrode within the borehole and in contact with the Earth via an operative capacitive coupling, an additional electrode disposed in the borehole opposite the first electrode, wherein the first electrode and the additional electrode constitute a pair of electrodes spaced in a direction orthogonal to the axis of the borehole, a first amplifier connected to the first electrode and an additional amplifier connected to the additional electrode, and a second electrode disposed outside the borehole, wherein the second electrode is part of a group of two or more counter electrodes remotely located from the borehole, and a second pair of electrodes in the borehole, the second pair constructed and arranged to measure a second component of the electrical field in a direction substantially orthogonal to the borehole, the method comprising:

measuring a first component of the electric field substantially orthogonal to the borehole axis with the amplifiers and the pair of electrodes to determine a value;

amplifying the value; and transmitting the value to a second location.

13. The method of claim 12, further comprising: installing the system within the ground to monitor a change of fluid quantity within the ground.

14. The method of claim 12, further comprising: installing the system within the ground in order to provide data used for enhanced recovery of oil.

15. The method of claim 12, further comprising: using the system for guiding a direction of travel during directional drilling in the Earth.

16. The method of claim 12, wherein the method is employed in a custom borehole drilled solely for a generating or measuring operation.

* * * * *